United States Patent
Wei et al.

(10) Patent No.: US 10,008,092 B2
(45) Date of Patent: Jun. 26, 2018

(54) METHOD, APPARATUS, AND STORAGE MEDIUM FOR ALERTING COOKING STATE OF ELECTRIC COOKER

(71) Applicant: Beijing Xiaomi Mobile Software Co., Ltd., Haidian District, Beijing (CN)

(72) Inventors: Liang Wei, Beijing (CN); Yan Xie, Beijing (CN); Yue Cheng, Beijing (CN)

(73) Assignee: BEIJING XIAOMI MOBILE SOFTWARE CO., LTD., Haidian District, Beijing (CN)

( * ) Notice: Subject to any disclaimer, the term of this patent is extended or adjusted under 35 U.S.C. 154(b) by 0 days. days.

(21) Appl. No.: 15/430,564

(22) Filed: Feb. 13, 2017

(65) Prior Publication Data

US 2017/0249826 A1    Aug. 31, 2017

(30) Foreign Application Priority Data

Feb. 25, 2016 (CN) .......................... 2016 1 0105796

(51) Int. Cl.
- G08B 21/18 (2006.01)
- H05B 1/02 (2006.01)
- H04L 12/28 (2006.01)
- F24C 7/08 (2006.01)

(52) U.S. Cl.
CPC ................ *G08B 21/18* (2013.01); *F24C 7/08* (2013.01); *H04L 12/2829* (2013.01); *H05B 1/0258* (2013.01); *H04L 2012/285* (2013.01)

(58) Field of Classification Search
CPC .............................. G08B 21/18; H05B 1/0258

USPC .......................................................... 340/635
See application file for complete search history.

(56) References Cited

U.S. PATENT DOCUMENTS

| 2010/0049578 | A1  | 2/2010  | Salerno |
| 2011/0182227 | A1* | 7/2011  | Rune ..................... H04W 8/082 370/312 |
| 2013/0260320 | A1  | 10/2013 | Townsend |
| 2015/0036573 | A1* | 2/2015  | Malik ............... H04W 52/0254 370/311 |
| 2015/0064314 | A1* | 3/2015  | Manuel .................. A47J 36/32 426/231 |

FOREIGN PATENT DOCUMENTS

| CN | 102932214 A | 2/2013 |
| CN | 103558778 A | 2/2014 |
| CN | 103701673 A | 4/2014 |
| CN | 103770872 A | 5/2014 |

(Continued)

OTHER PUBLICATIONS

International Search Report of PCT/CN2016/098261.

(Continued)

*Primary Examiner* — Omer S Khan
(74) *Attorney, Agent, or Firm* — Jun He Law Offices P.C.; James J. Zhu

(57) ABSTRACT

Disclosed are a method, apparatus, and storage medium for alerting a cooking state of an electric cooker. The method includes: detecting a current cooking state of an electric cooker; generating cooking state alert information when a preset cooking state is detected; and sending the cooking state alert information to a target terminal for alerting a user to the current cooking state of the electric cooker.

8 Claims, 14 Drawing Sheets

(56) References Cited

FOREIGN PATENT DOCUMENTS

| CN | 104506599 A | 4/2015 |
| CN | 105125088 A | 12/2015 |
| CN | 105676699 A | 6/2016 |

OTHER PUBLICATIONS

Extended European Search Report of European Patent Application No. 17155141.9, from the European Patent office, dated Jun. 9, 2017.
Jose M. Reyes Alamo, "Composition of services for notification in smart homes", 2008 Second International Symposium on Universal Communication, Dec. 15, 2008, pp. 75-78.
Muhammad Waqar Aziz, "Service-oriented layered architecture for smart home", International Journal of Smart Home, vol. 7, No. 6, Nov. 30, 2013, pp. 409-418.

* cited by examiner

METHOD, APPARATUS, AND STORAGE MEDIUM FOR ALERTING COOKING STATE OF ELECTRIC COOKER

CROSS REFERENCE TO RELATED APPLICATIONS

The application is based upon and claims priority to Chinese Patent Application No. 201610105796.6, filed on Feb. 25, 2016, the entire contents of which are incorporated herein by reference.

TECHNICAL FIELD

The present disclosure relates to the technical field of computer communications, and in particular to a method apparatus, and storage medium for alerting a cooking state of an electric cooker.

BACKGROUND

With the development of science and technology and the improvement of people's living standard, small household appliances such as electric cookers have been commonly used in houses. Typically, electric cookers are already designed to be intelligent. For example, after a user adds ingredients to the container of an electric cooker, sets a corresponding cooking mode and starts the device, he/she can do other things and the electric cooker will complete the cooking task automatically.

However, the typical intelligent implementation of the electric cooker is still based on an intelligent design of the device itself. For example, after completing cooking according to a preset cooking mode, the electric cooker will send out a prompt sound to prompt the user of the completion of cooking. If the user is far away from the electric cooker or is not familiar with the prompt sound of the electric cooker, he/she may not notice or even cannot recognize the prompt information from the electric cooker. Therefore, the electric cooker provides a poor user experience.

SUMMARY

In view of this, the present disclosure provides a method, apparatus, and storage medium for alerting a cooking state.

According to a first aspect of embodiments of the present disclosure, a method for altering a cooking state of an electric cooker is provided. The method is implemented in an electric cooker and includes: detecting a current cooking state of the electric cooker; generating cooking state alert information when a preset cooking state is detected; and sending the cooking state alert information to a target terminal for alerting a user to the current cooking state of the electric cooker.

According to a second aspect of the embodiments of the present disclosure, an apparatus for alerting a cooking state of an electric cooker is provided. The apparatus includes: a processor; and a memory for storing instructions executable by the processor. The processor is configured to: detect a current cooking state of the electric cooker; generate cooking state alert information when a preset cooking state is detected; and send the cooking state alert information to a target terminal for alerting a user to the current cooking state of the electric cooker.

According to a third aspect of the embodiments of the present disclosure, there is provided a non-transitory computer-readable storage medium having stored therein instructions that, when executed by a processor of a mobile terminal, causes the mobile terminal to perform a method for alerting a cooking state of an electric cooker. The method includes: detecting a current cooking state of the electric cooker; generating cooking state alert information when a preset cooking state is detected; and sending the cooking state alert information to a target terminal for alerting a user to the current cooking state of the electric cooker.

It is to be understood that both the foregoing general description and the following detailed description are exemplary and explanatory only and are not restrictive of the present disclosure.

BRIEF DESCRIPTION OF THE DRAWINGS

The accompanying drawings, which are incorporated in and constitute a part of the specification, illustrate embodiments according to the present disclosure and serve to explain the principles of the present disclosure together with the description.

FIG. 4-1 is a schematic diagram of an application scenario for alerting a cooking state according to an exemplary embodiment of the present disclosure;

FIG. 4-2 is a schematic diagram of another application scenario for alerting a cooking state according to an exemplary embodiment of the present disclosure;

FIG. 5-1 is a schematic diagram of an application scenario for alerting a cooking state according to an embodiment of the present disclosure;

FIG. 5-2 is a schematic diagram of another application scenario for alerting a cooking state according to an embodiment of the present disclosure;

DETAILED DESCRIPTION

Here, exemplary embodiments will be described in detail, examples of which are illustrated in the accompanying drawings. The following description refers to the accompanying drawings in which the same numbers in different figures represent the same or similar elements unless otherwise indicated. The implementations set forth in the following description of exemplary embodiments do not represent all implementations consistent with the present disclosure. Instead, they are merely examples of apparatuses and methods consistent with aspects related to the present disclosure as recited in the appended claims.

The terms used in the present disclosure are merely for the purpose of illustrating specific embodiments, rather than limiting the present disclosure. The singular forms used in the present disclosure and the claims such as "a/an", "said" and "the" are also intended to include their plural forms, unless otherwise stated clearly in the context. It should be also understood that the term "and/or" used herein refers to and includes any of one or more associated listed items or any or all possible combinations thereof.

It should be understood that various information may be described with terms such as first, second, third and so on in the present disclosure, but such information is not limited to these terms. These terms are merely used for distinguishing different information of the same type. For example, without departing from the scope of the present disclosure, the first information may also be referred to as the second information, and likewise the second information may also be referred to as the first information. Depending on the context, the term "if" used herein can be interpreted as "when" or "at the time" or "in response to determining".

In the embodiments of the present disclosure, involved executing parties include: an electric cooker, a target terminal and an intermediate device. The target terminal may be a smart phone, a personal digital assistant, a tablet, a smart TV, a wearable device and so on. The intermediate device may be a smart phone, a router and so on. In practical implementation, the electric cooker, the intermediate device and the target terminal not only operate independently but also interact with each other to implement the technical solution provided in the embodiments of the present disclosure together. To facilitate description, the embodiments of the present disclosure are described from the perspective of the electric cooker.

Figure 1:
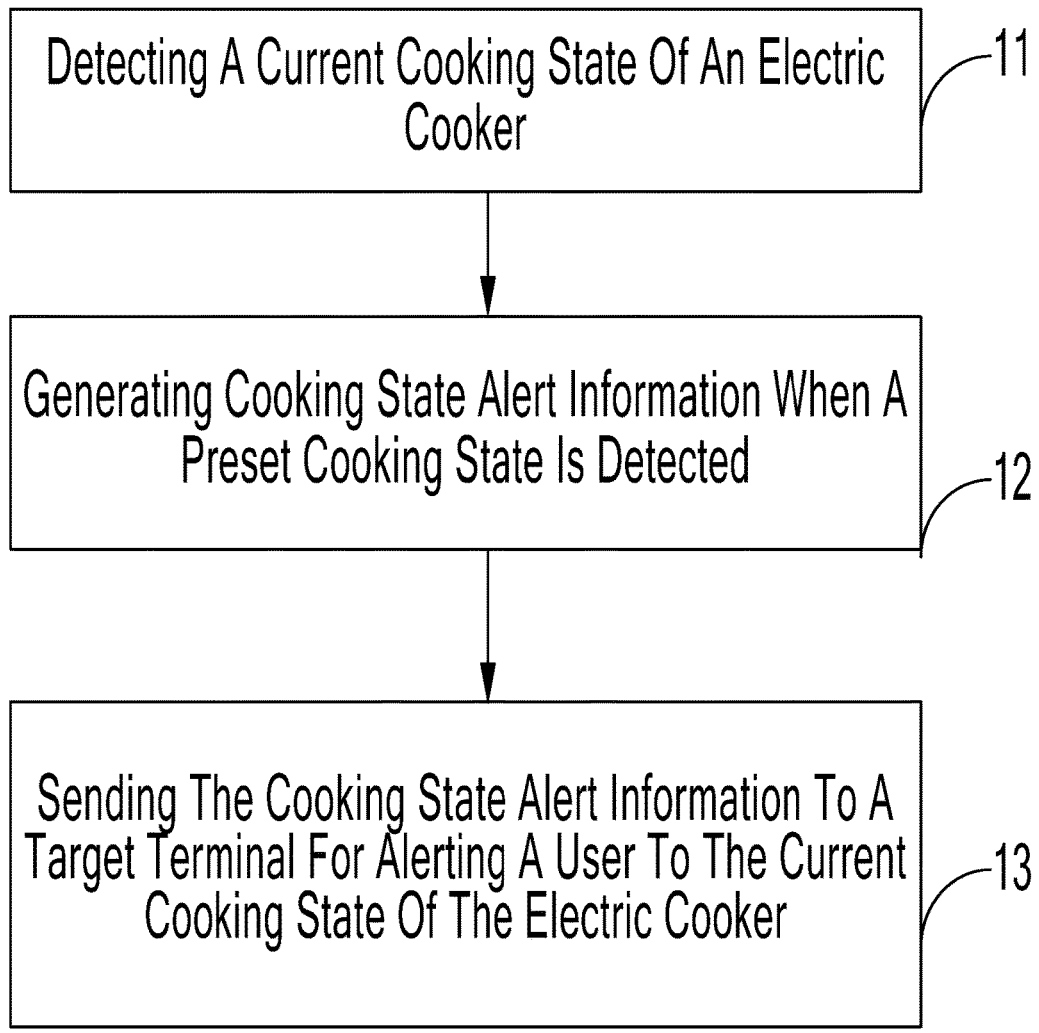
FIG. 1 is a flowchart of a method for alerting a cooking state according to an embodiment of the present disclosure.

FIG. 1 is a flowchart of a method for alerting a cooking state according to an embodiment of the present disclosure. As shown in FIG. 1, the method may include the following steps.

In step 11, a current cooking state of an electric cooker is detected.

The electric cooker determines the current cooking state of the food in its container based on parameter data obtained by a built-in timer or various sensors, such as a temperature sensor, a pressure sensor and so on.

In step 12, cooking state alert information is generated when a preset cooking state is detected.

In the present disclosure, the preset cooking state includes, but is not limited to, the following states.

A first state is a cooking completion state. If the electric cooker detects that a cooking task is completed, cooking completion alert information may be generated so as to alert a user that the cooking task is completed and the food can be eaten.

A second state is a state of reaching a target cooking stage. For example, during a cooking process requiring different spices to be placed at different cooking stages, a preset time length or other parameter information may be preset to represent the reaching of the target cooking stage. If the electric cooker determines that the current cooking state of the electric cooker reaches a target cooking state by detecting corresponding parameters, corresponding cooking state alert information may be generated so as to prompt the user to perform a corresponding cooking operation.

A third state is a state where there is a preset time before completion of a cooking task (for example, there remains 15 minutes before the cooking is completed and so on). If the electric cooker learns that there remains a preset time length from the current cooking state to the completion of the cooking task by detecting and analyzing the cooking time or other parameter data, corresponding cooking state alert information may be generated so as to prompt the user to get ready to have a meal in time.

In step 13, the cooking state alert information is sent to a target terminal for alerting a user to the current cooking state of the electric cooker.

The target terminal may be one or more of a smart TV, a tablet, a personal digital assistant, a smart phone and so on in a house. In an embodiment of the present disclosure, the target terminal may be one or more target terminals preset by the user, such as a smart TV.

In another embodiment of the present disclosure, the target terminal may also be one or more terminals within a local range determined by the electric cooker in real time. For example, if the preset cooking state is a cooking completion state or a state where there is a preset time before completion of a cooking task, the electric cooker may determine all the user terminals in the local range as target terminals.

Figure 2:
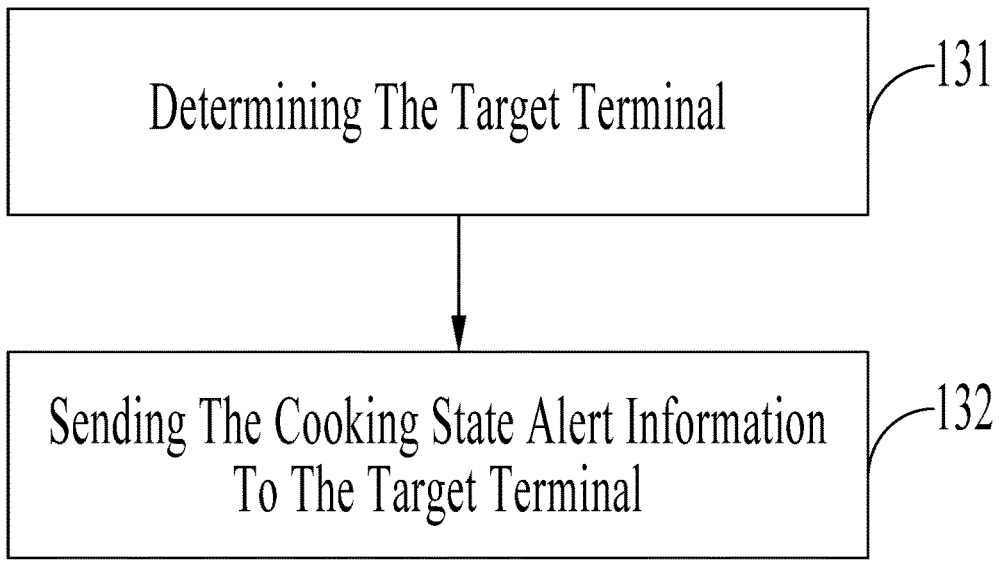
FIG. 2 is a flowchart of another method for alerting a cooking state according to an embodiment of the present disclosure.

FIG. 2 is a flowchart of another method for alerting a cooking state according to an embodiment of the present disclosure. As shown in FIG. 2, the above step 13 may include the following steps.

In step 131, the target terminal is determined.

For example, all or some terminals within the same local area network as the electric cooker are determined as target terminals; and/or all user terminals directly communicating with the electric cooker are determined as target terminals.

Figure 3:
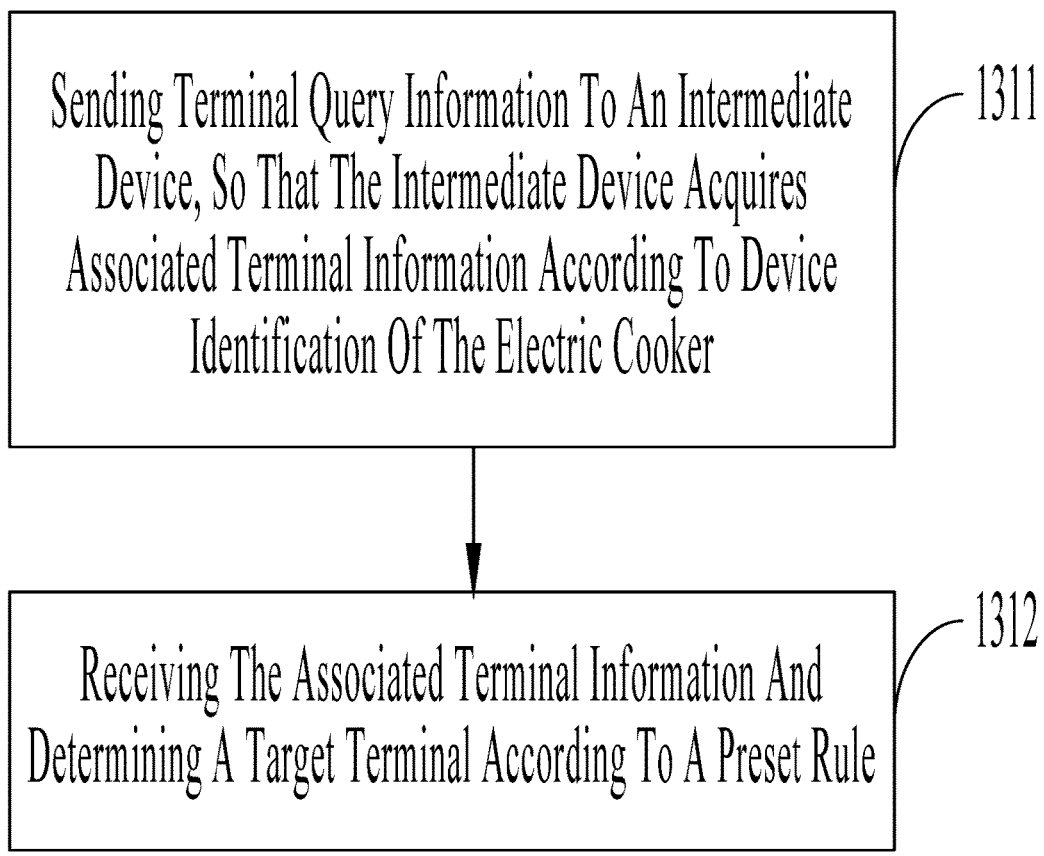
FIG. 3 is a flowchart of another method for alerting a cooking state according to an embodiment of the present disclosure.

FIG. 3 is a flowchart of another method for alerting a cooking state according to an embodiment of the present disclosure. As shown in FIG. 3, in an embodiment of the present disclosure, the above step 131 may include the following steps.

In step 1311, terminal query information is sent to an intermediate device, the terminal query information including a device identification of the electric cooker so that the intermediate device acquires associated terminal information according to the device identification of the electric cooker, the associated terminal information including terminal identifications of all communication terminals within the same local area network as the electric cooker.

It is assumed that the intermediate device is a router. When a cooking task is completed or is about to be completed, the electric cooker sends terminal query information to the router. The router determines all communication terminals within the same local area network as the electric cooker as associated terminals according to information about terminals which access the network currently, generates associated terminal information and sends the same to the electric cooker. The associated terminal information includes terminal identifications of all communication terminals.

In step 1312, the associated terminal information is received and the target terminal is determined according to a preset rule.

The associated terminals acquired by the router may include: one or more smart phones, a smart refrigerator, a smart door and window, a smart air conditioner, a smart TV, a smart lock, a wearable device, a personal digital assistant, a desktop computer, a laptop computer, a tablet computer and so on. The electric cooker may set some of the associated terminals as target terminals according to a preset rule. For example, terminals carried by the user such as a smart phone, a wearable device and a tablet computer are determined as target terminals and/or a terminal with many audiences such as a smart TV is determined as a target terminal, so as to improve the effectiveness of information alerting.

In step 132, the cooking state alert information is sent to the target terminal.

In embodiments of the present disclosure, with different communication methods, the electric cooker may send the cooking state alert information to the target terminal directly or indirectly.

Figures 1, 4:
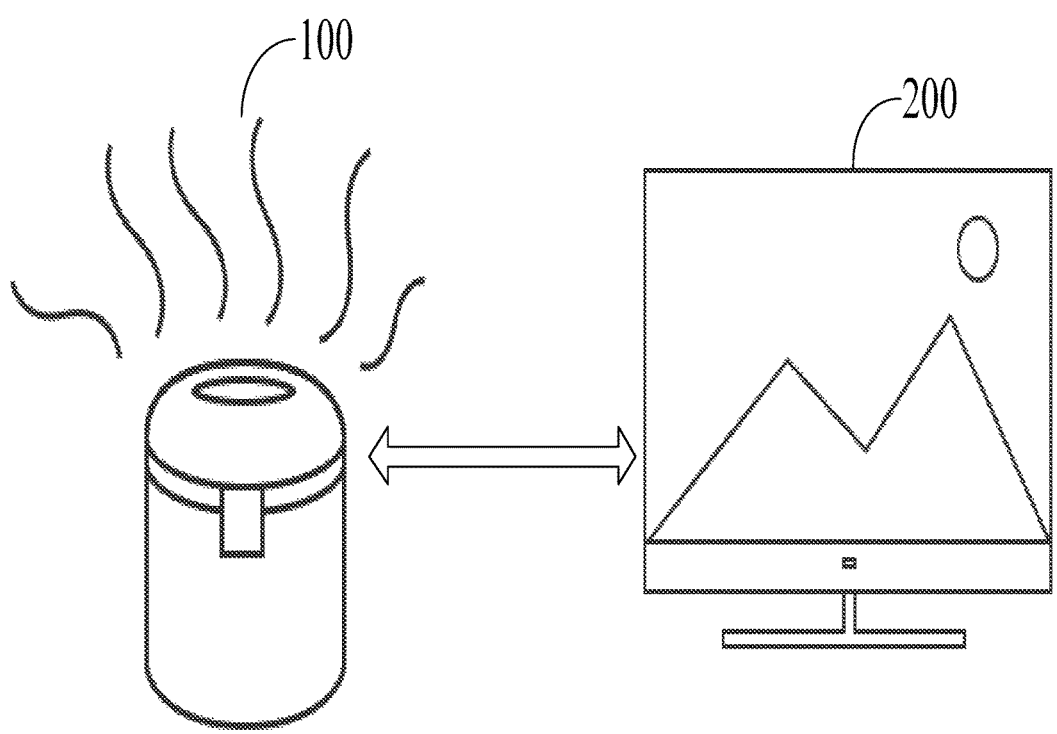
Figures 2, 4:
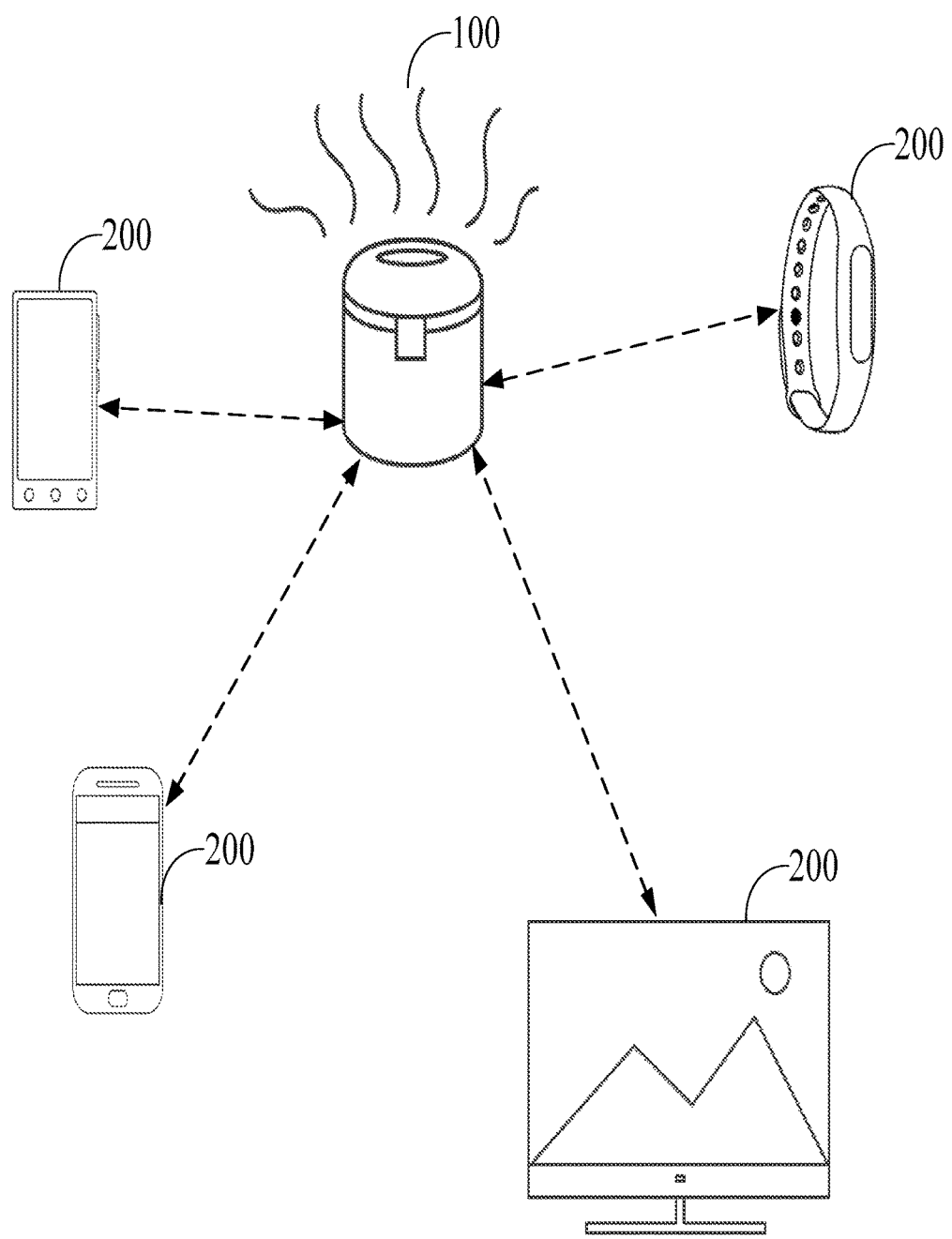

As to sending the cooking state alert information to the target terminal directly, the electric cooker may send the cooking state alert information to the target terminal directly in a wireless communication manner. Taking the target terminal being a smart TV as an example, the electric cooker may establish a wireless communication connection with the smart TV in a short-range communication manner such as Zigbee, Bluetooth, Z-wave, infrared, WiFi and so on, so as to send the cooking state alert information to the smart TV in the communication manner for displaying. Reference can be made to FIGS. 4-1 and 4-2 which are schematic diagrams of application scenarios.

FIG. 4-1 is a schematic diagram of an application scenario for cooking state alerting according to an exemplary embodiment of the present disclosure. In the embodiment of the present disclosure, an electric cooker 100 may send the cooking state alert information to a target terminal 200 directly in a wireless communication manner. The target terminal is a smart TV.

FIG. 4-2 is a schematic diagram of another application scenario for cooking state alerting according to an exemplary embodiment of the present disclosure. FIG. 4-3 is different from FIG. 4-1 in that the electric cooker 100 may send the cooking state alert information to a plurality of target terminals 200 directly in a wireless communication manner. The plurality of target terminals include a smart TV, two smart phones and a smart wristband.

Figures 1, 5:
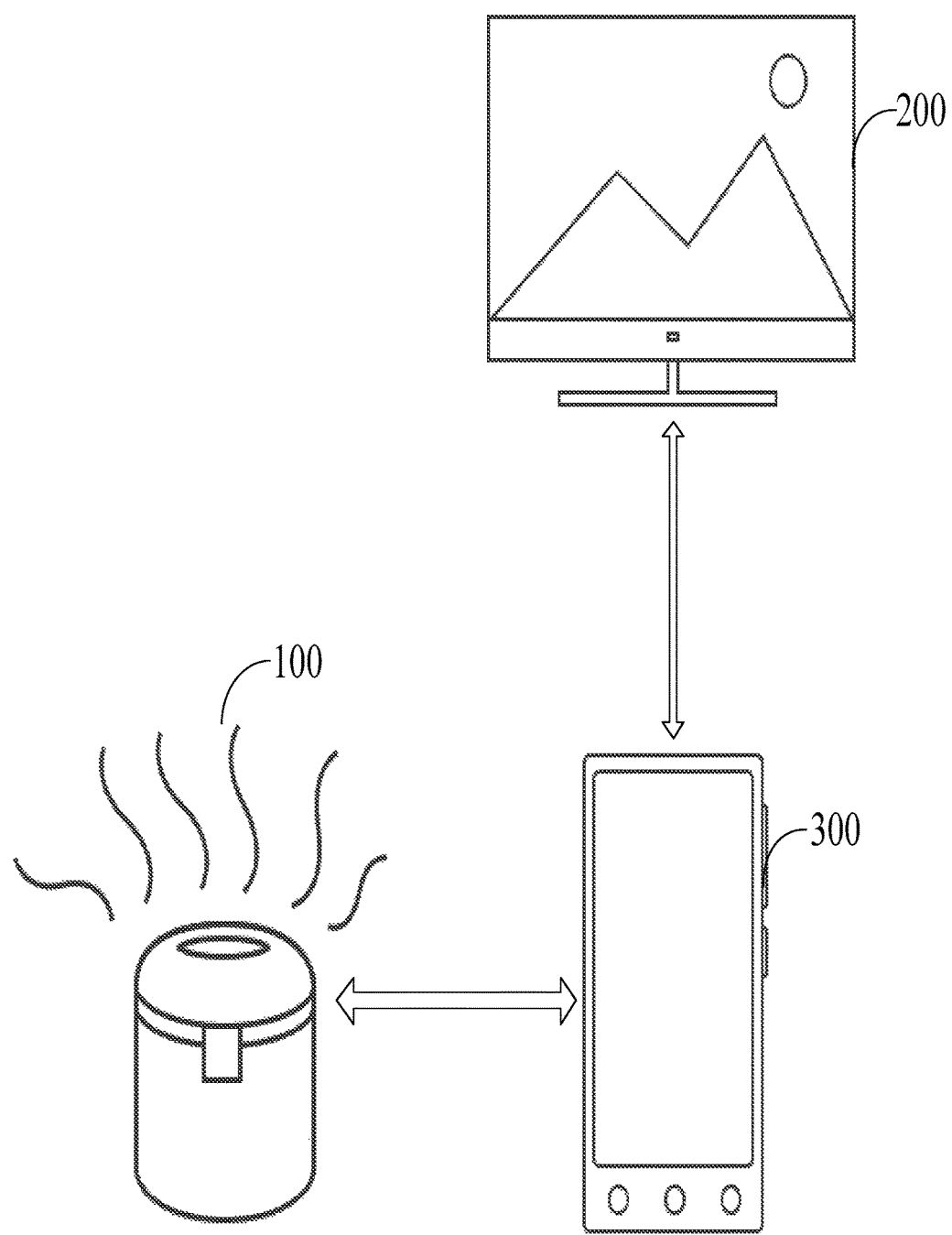
Figures 2, 5:
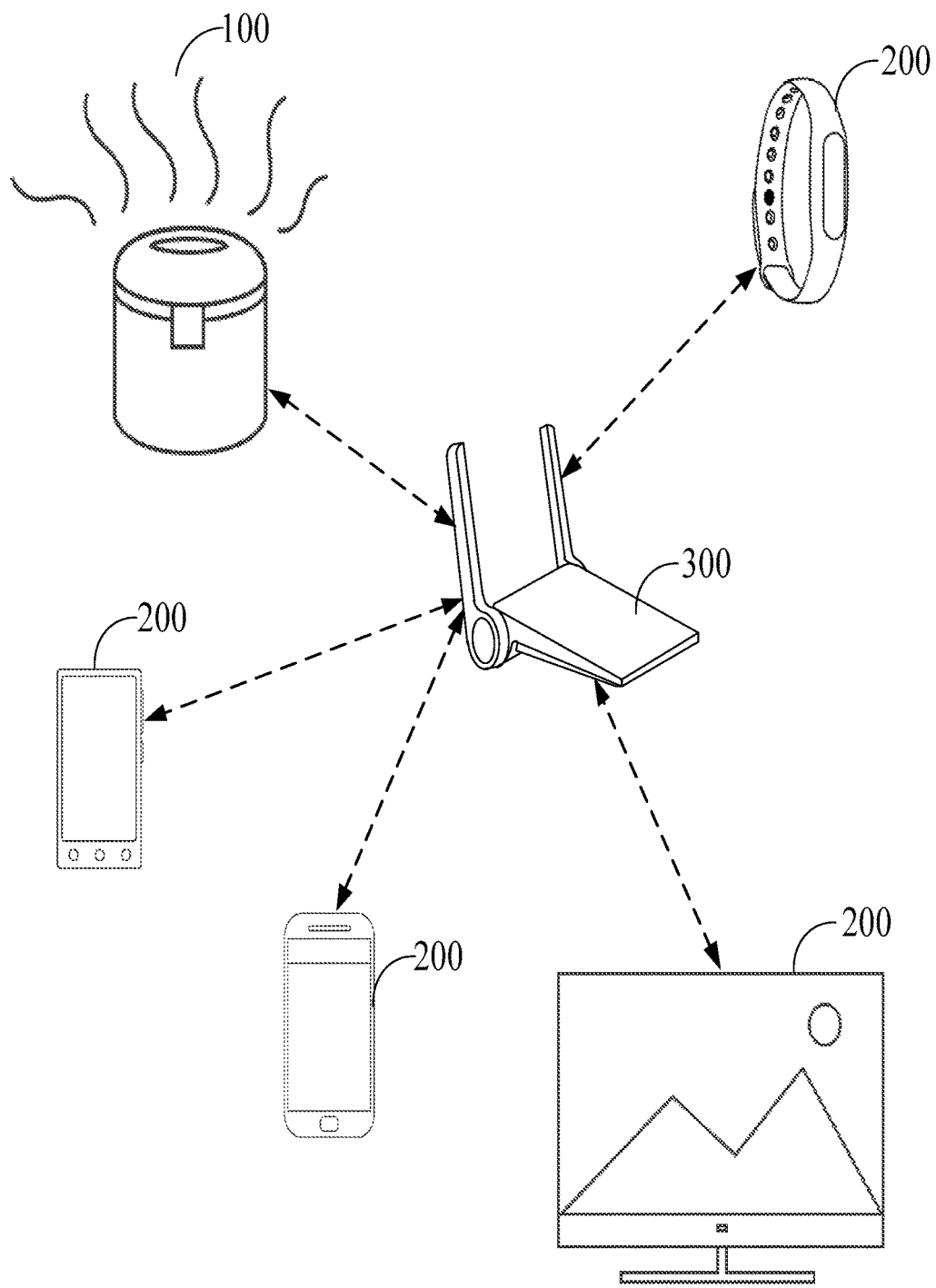

As to sending the cooking state alert information to the target terminal indirectly, the electric cooker cannot establish a communication connection with a target terminal directly. For example, when the distance between the electric cooker and the target terminal exceeds an effective distance of a preset wireless communication scheme or the communication module of the electric cooker does not match that of the target terminal, an intermediate device is needed to forward the cooking state information to the target terminal. Still taking the target terminal being a smart TV as an example, it is assumed that the intermediate device is a wireless router or a mobile phone terminal. In the intermediate device, a correspondence between the device identification of the electric cooker and the device identification of the target terminal is configured in advance. After the intermediate device receives the cooking state alert information sent by the electric cooker, it can forward the cooking state alert information to the target terminal for displaying, by querying the correspondence between the device identification of the electric cooker and the device identification of the target terminal. FIG. 5-1 is a schematic diagram of an application scenario for cooking state alerting according to an embodiment. As shown, the electric cooker 100 may send the cooking state alert information to the target terminal 200 through an intermediate device 300 (a smart phone).

FIG. 5-2 is a schematic diagram of another application scenario for cooking state alerting according to an exemplary embodiment. FIG. 5-2 is different from FIG. 5-1 in that the target terminal 200 may include a plurality of terminals in a house, and the intermediate device 300 may be a wireless router.

In an embodiment of the present disclosure, to ensure accurate transfer of the cooking state alert information, before sending the cooking state alert information, the electric cooker may further determine whether the target terminal is in a normal operating state currently.

Figure 6:
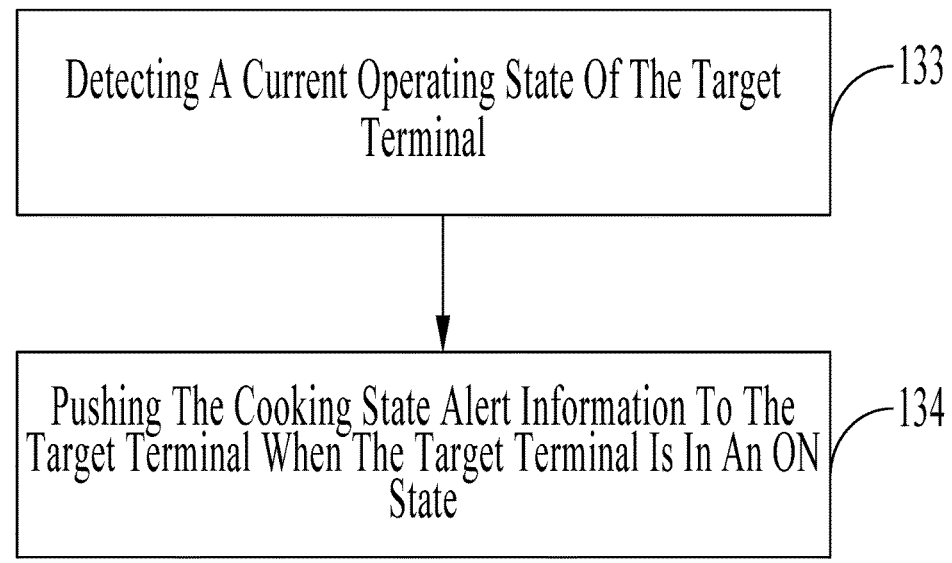
FIG. 6 is a flowchart of another method for alerting a cooking state according to an embodiment of the present disclosure.

FIG. 6 is a flowchart of another method for alerting a cooking state according to an embodiment of the present disclosure. If the target terminal is a preset terminal, the above step 13 may include the following steps.

In step 133, a current operating state of the target terminal is detected.

Corresponding to different communication schemes between the electric cooker and the target terminal, there are the following situations for the implementation of step 131.

In a situation corresponding to sending the cooking state alert information to the target terminal directly, the electric cooker may send operating state query information to the target terminal directly. If the target terminal is in an ON state, it may feed back response information to show its own current operating state. If the target terminal is in an OFF state, it will not feed back any information to the electric cooker. The electric cooker may derive the current operating state of the target terminal according to the feedback information received so as to decide whether to push the cooking state alert information to the target terminal. Still taking the target terminal being a smart TV as an example, if the smart TV is in an ON state, the cooking state alert information will be pushed to the smart TV. If the smart TV is in an OFF state, the cooking state alert information will not be pushed to the smart TV, so as not to occupy network resources.

Corresponding to the above sending the cooking state alert information to the target terminal indirectly, there may be the following situations.

In a situation, an intermediate device forwards the operating state query information and the feedback information from the target terminal.

That is, the electric cooker sends the operating state query information to the intermediate device such as a router. The operating state query information includes the device identification of the electric cooker and the terminal identification of the target terminal. The intermediate device then forwards the operating state query information to the target terminal. If the target terminal is in an ON state, it sends feedback information to the intermediate device, and then the intermediate device sends the feedback information to the electric cooker.

Figure 7:
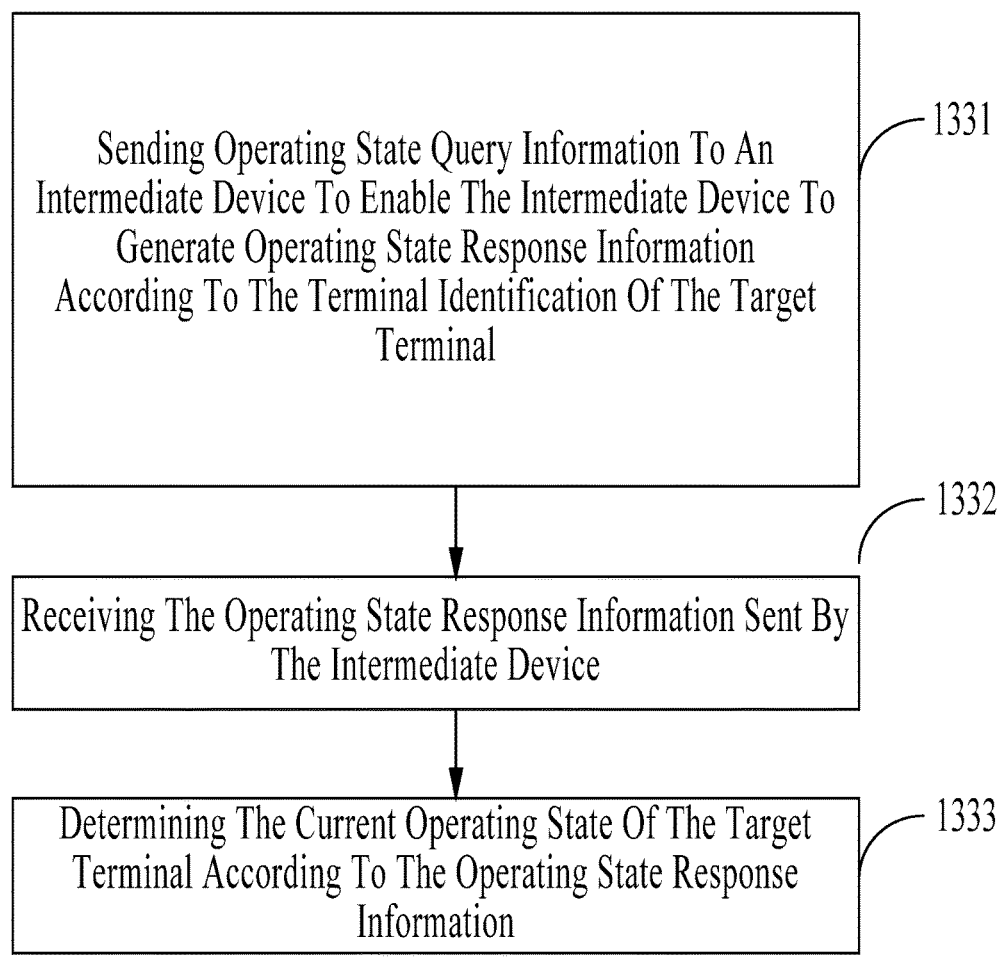
FIG. 7 is a flowchart of another method for alerting a cooking state according to an embodiment of the present disclosure.

In another situation, the current operating state of the target terminal is acquired according to an information record on an intermediate device. FIG. 7 is a flowchart of another method for alerting a cooking state according to an embodiment. As shown, the above step 133 may include the following steps.

In step 1331, operating state query information is sent to the intermediate device. The operating state query information including a terminal identification of the target terminal, so that the intermediate device acquires operating data of the target terminal according to the terminal identification of the target terminal, so as to determine operating state information of the target terminal and generate operating state response information.

In an embodiment of the present disclosure, the intermediate device is a user terminal provided with a smart TV APP, such as a smart phone installed with an APP named "TV assistant". After the smart phone receives the operating state query information, the current operating state of the smart TV may be derived according to data communicated with the smart TV. For example, whether the smart TV is in an OFF state can be determined according to whether operating data (such as various operation feedback information, data for playing and so on) fed back by the smart TV is received within a preset time period. If the intermediate device acquires the operating data of the smart TV within the preset time period, it can be determined that the smart TV is in an ON state currently, so that an operating state response message indicating the ON state may be generated and sent to the electric cooker. If the intermediate device does not record or acquire any operating data of the smart TV within the preset time period, it can be determined that the smart TV is in an OFF state currently, so that an operating state response message indicating the OFF state may be generated and sent to the electric cooker.

In step 1332, the operating state response information sent by the intermediate device is received.

The operating state response information may include information indicating that the target terminal is in an ON state currently or the target terminal is in an OFF state currently.

In step 1333, the current operating state of the target terminal is determined according to the operating state response information.

The electric cooker extracts the current operating state information of the target terminal from the operating state response information, and determines whether the target terminal is in an ON or OFF state currently according to the current operating state information of the target terminal.

In step 134, the cooking state alert information is pushed to the target terminal when the target terminal is in an ON state.

When determining that the target terminal is in an ON state currently, the electric cooker may actively push the cooking state alert information to the target terminal.

Figure 8:
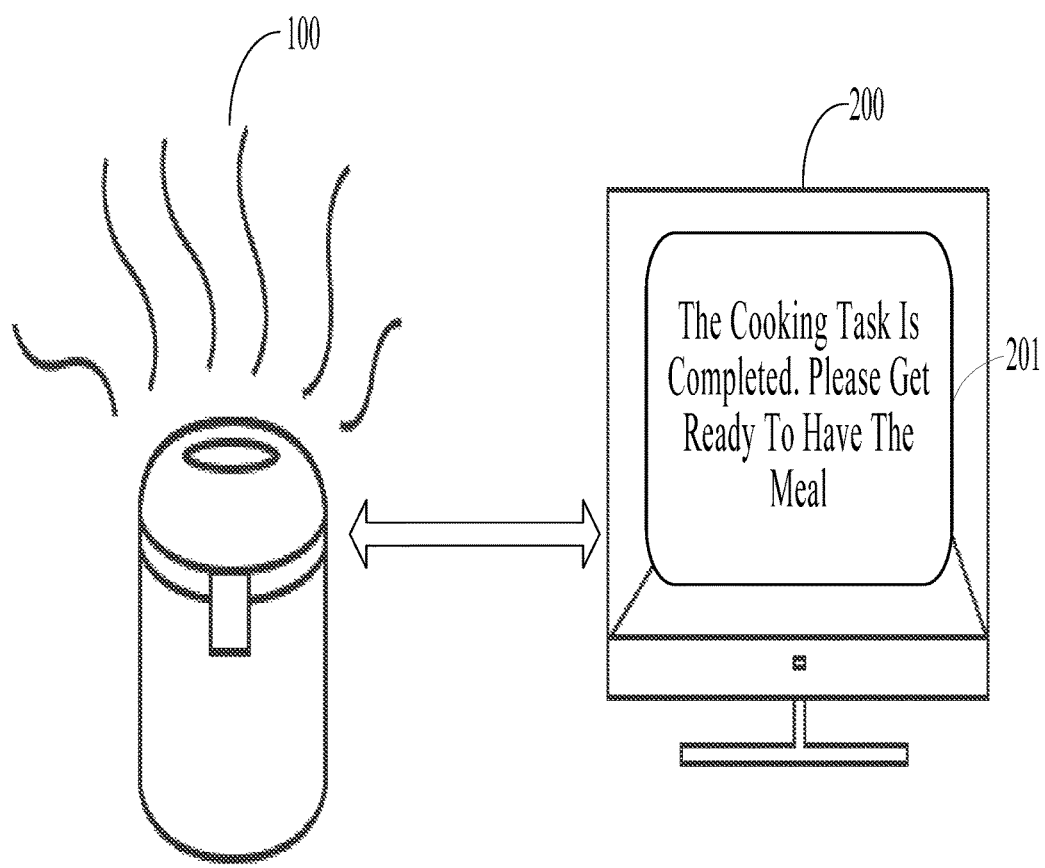
FIG. 8 is a schematic diagram of an application scenario for alerting a cooking state according to an exemplary embodiment of the present disclosure.

After receiving the cooking state alert information, the target terminal may alert the user to the current cooking state of the electric cooker in the form of text, picture, sound, video and so on, so as to prompt the user to get ready to have a meal, perform a next cooking step or the like. FIG. 8 is a schematic diagram of an application scenario for cooking state alerting according to an exemplary embodiment. When a smart TV 200 receives cooking state alert information (such as a cooking task is completed), a prompt box 201 may be popped up on the currently displayed video picture, showing "The cooking task is completed. Please be noted to have the meal in time", so as to prompt family members watching TV to have the meal.

Thus, by using the method for alerting a cooking state provided in the present disclosure, after detecting a preset cooking state, an electric cooker may generate cooking state alert information and sends the same to a target terminal for displaying, so as to alert the user to the information effectively and in time, thereby improving the intelligence of the electric cooker and accordingly improving the user experience of the electric cooker.

For the sake of simple description, the above various method embodiments are described as a combination of a series of acts. However, those skilled in the art shall appreciate that the present disclosure is not limited by the order of the described acts, because some steps may be performed in another order or simultaneously according to the present disclosure.

Secondly, those skilled in the art shall also appreciate that the embodiments described in the description are all optional embodiments and the involved acts and modules are not necessarily required by the present disclosure.

Corresponding to the above method embodiments, the present disclosure also provides apparatus embodiments and corresponding terminal embodiments.

Corresponding to the above embodiments of the method for alerting a cooking state, embodiments of an apparatus for alerting a cooking state provided in an electric cooker are also provided. Detailed description will be given in conjunction with the accompanying drawings hereinafter.

Figure 9:
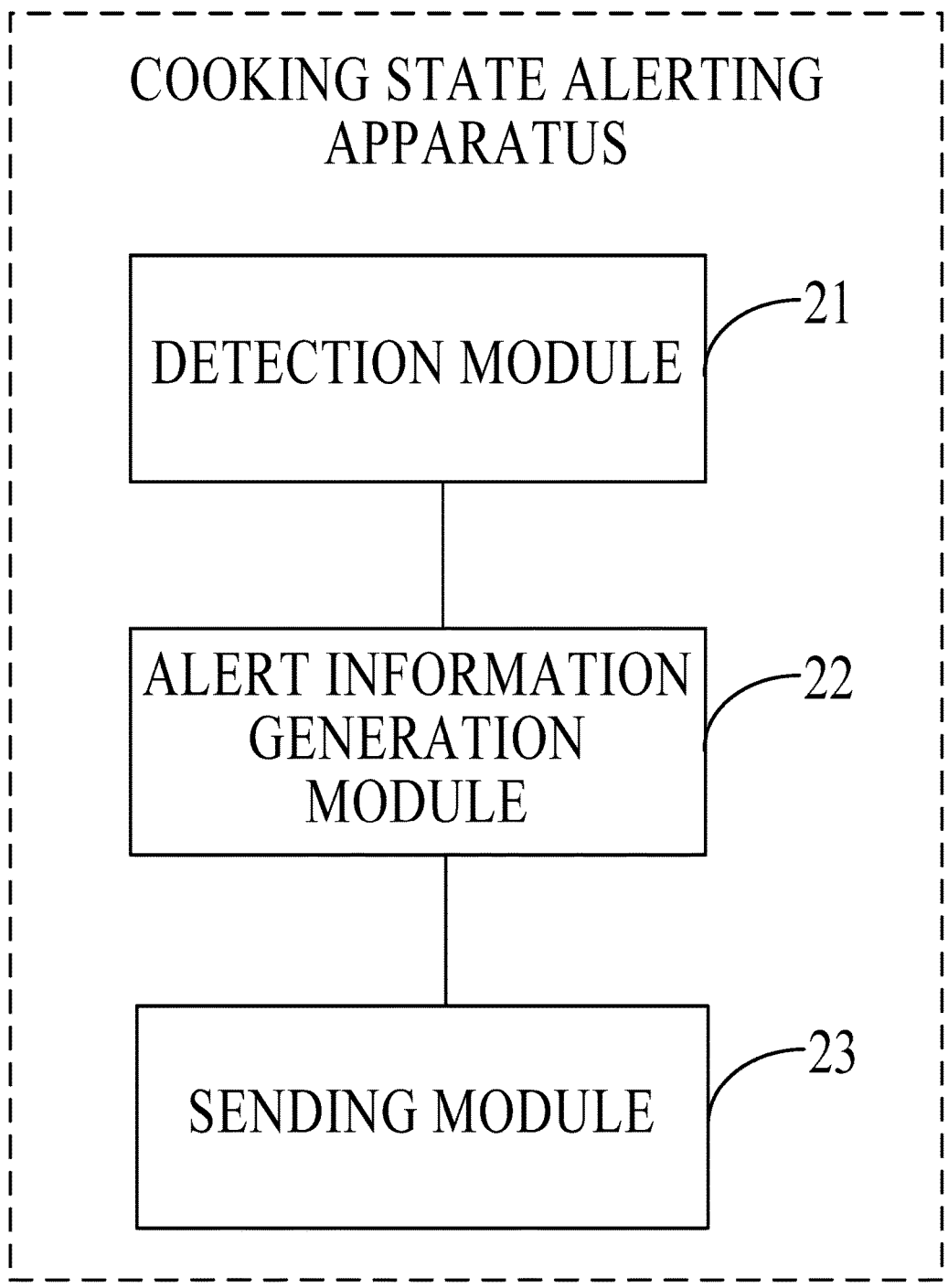
FIG. 9 is a block diagram of an apparatus for alerting a cooking state according to an exemplary embodiment of the present disclosure.

FIG. 9 is a block diagram of an apparatus for alerting a cooking state according to an exemplary embodiment. The apparatus includes: a detection module 21 configured to detect a current cooking state of the electric cooker; an alert information generation module 22 configured to generate cooking state alert information when a preset cooking state is detected; and a sending module 23 configured to send the cooking state alert information to a target terminal for alerting a user to the current cooking state of the electric cooker.

Figure 10:
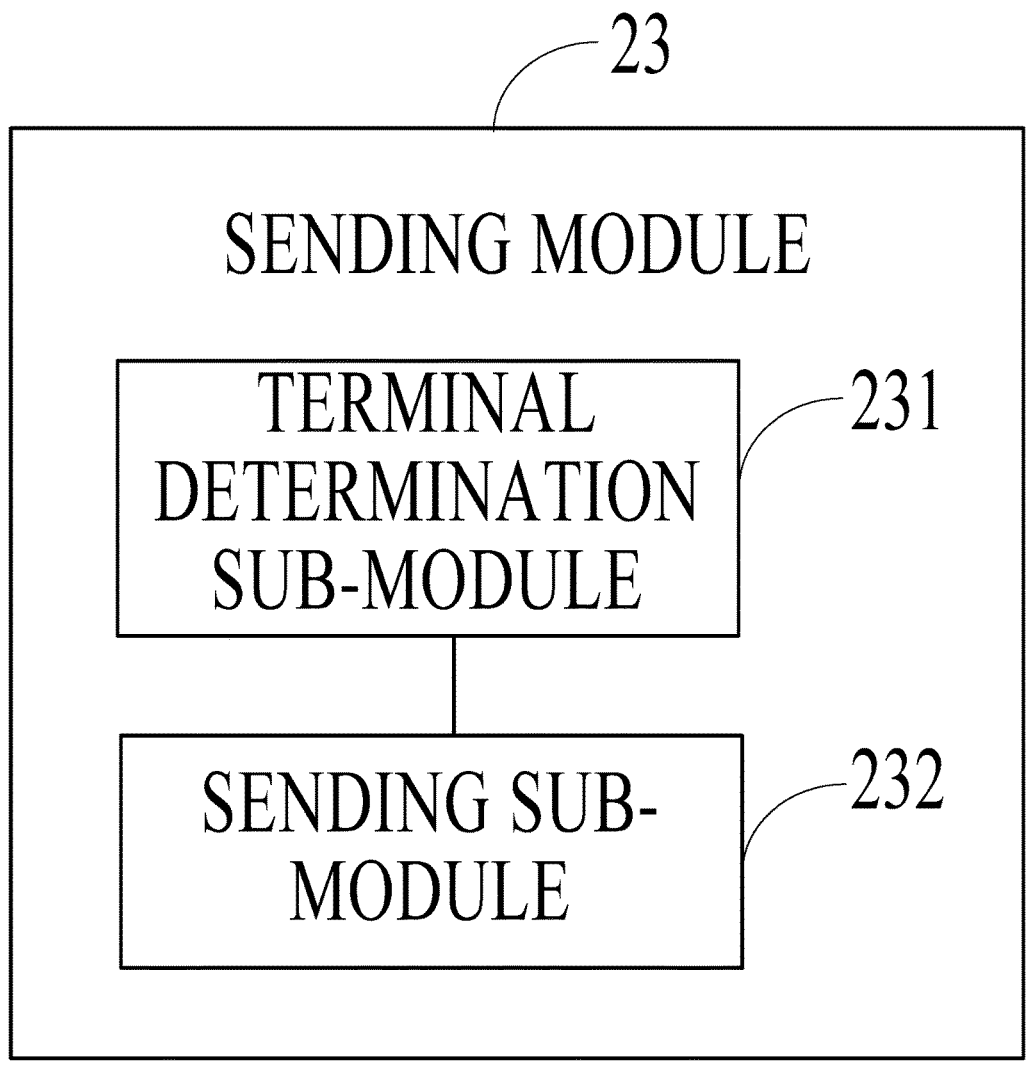
FIG. 10 is a block diagram of another apparatus for alerting a cooking state according to an exemplary embodiment of the present disclosure.

FIG. 10 is a block diagram of another apparatus for alerting a cooking state according to an exemplary embodiment. Further to the embodiment shown in FIG. 9, the sending module 23 may include: a terminal determination sub-module 231 configured to determine the target terminal; and a sending sub-module 232 configured to send the cooking state alert information to the target terminal.

Figure 11:
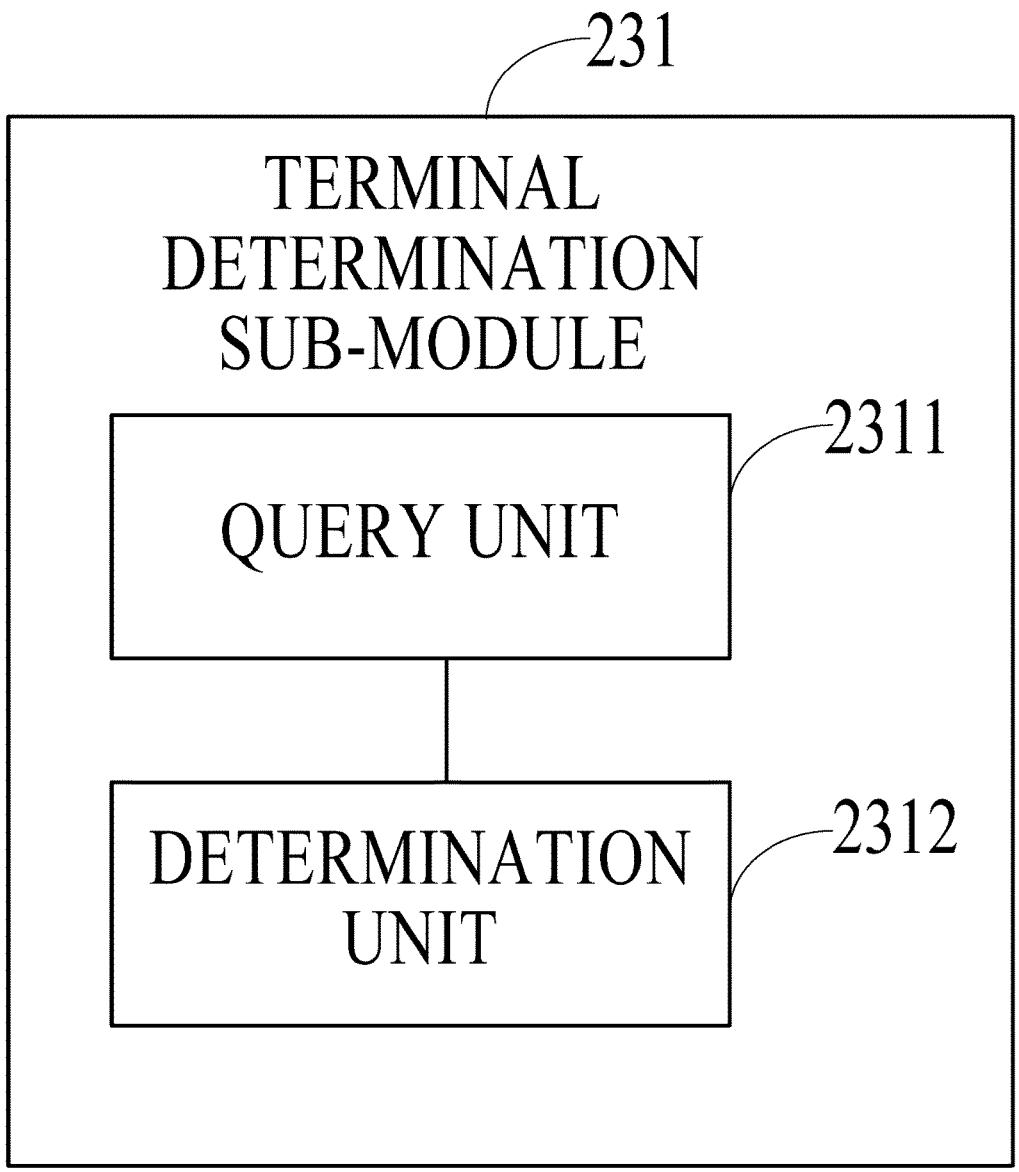
FIG. 11 is a block diagram of another apparatus for alerting a cooking state according to an exemplary embodiment of the present disclosure.

FIG. 11 is a block diagram of another apparatus for alerting a cooking state according to an exemplary embodiment. Further to the embodiment shown in FIG. 10, the terminal determination sub-module 231 may include: a query unit 2311 configured to send terminal query information to an intermediate device, the terminal query information including a device identification of the electric cooker so that the intermediate device acquires associated terminal information according to the device identification of the electric cooker, the associated terminal information including terminal identifications of all communication terminals within the same local area network as the electric cooker; and a determination unit 2312 configured to receive the associated terminal information and determine the target terminal according to a preset rule.

Figure 12:
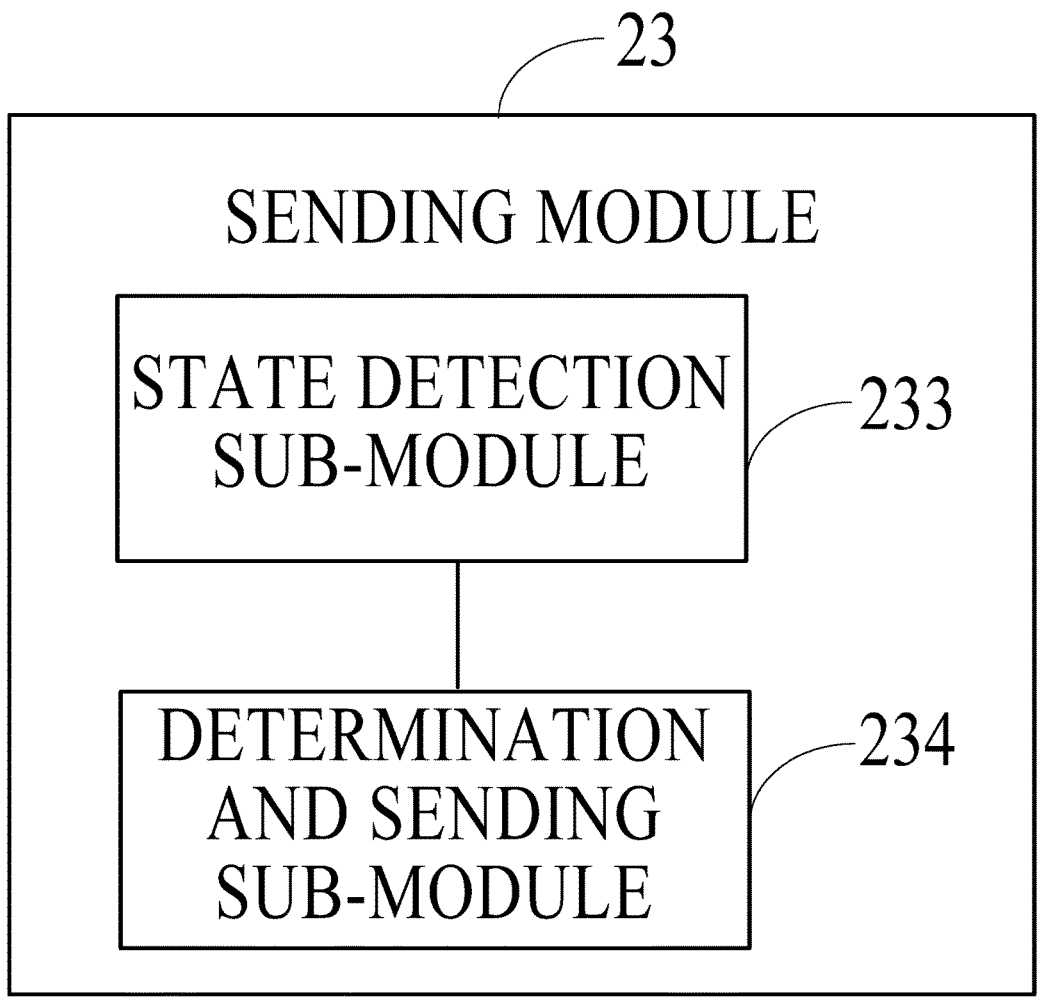
FIG. 12 is a block diagram of another apparatus for alerting a cooking state according to an exemplary embodiment of the present disclosure.

FIG. 12 is a block diagram of another apparatus for alerting a cooking state according to an exemplary embodiment. Further to the embodiment shown in FIG. 9, the sending module 23 may include: a state detection sub-module 233 configured to detect a current operating state of the target terminal; and a determination and sending sub-module 234 configured to push the cooking state alert information to the target terminal when the target terminal is in an ON state.

Figure 13:
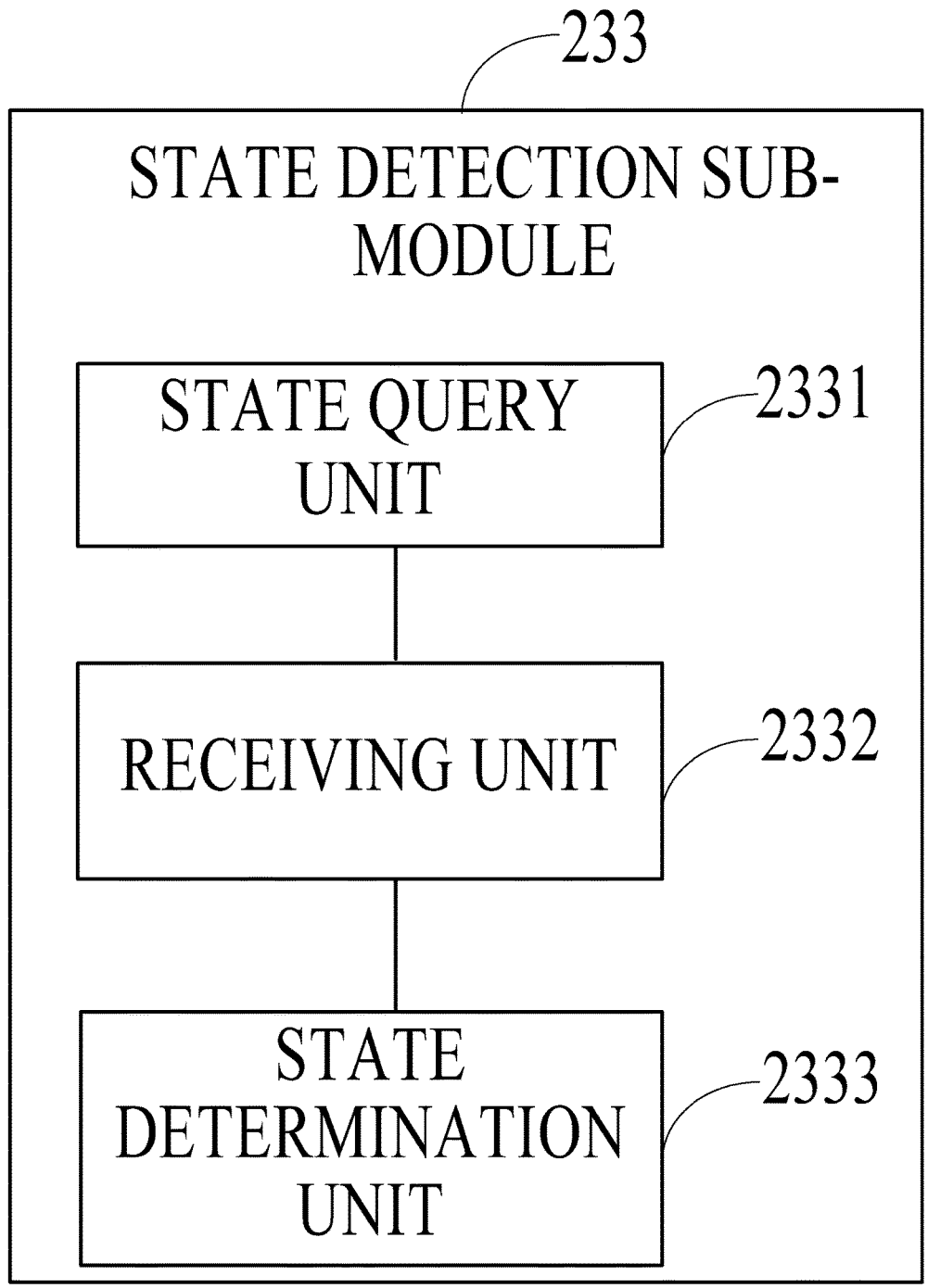
FIG. 13 is a block diagram of another apparatus for alerting a cooking state according to an exemplary embodiment of the present disclosure.

FIG. 13 is a block diagram of another apparatus for alerting a cooking state according to an exemplary embodiment. Further to the embodiment shown in FIG. 12, the state detection sub-module 233 may include: a state query unit 2331 configured to send operating state query information to an intermediate device, the operating state query information including a terminal identification of the target terminal, so that the intermediate device acquires operating data of the target terminal according to the terminal identification of the target terminal, so as to determine operating state information of the target terminal and generate operating state response information; a receiving unit 2332 configured to receive the operating state response information sent by the intermediate device; and a state determination unit 2333 configured to determine the current operating state of the target terminal according to the operating state response information.

In the embodiments of the present disclosure, the target terminal may be an electronic device having an information alerting function and especially an information display function such as a smart TV.

Reference can be made in particular to the implementation of corresponding steps in the above method, for the implementation of functions and effects of various units in the above apparatus, which will not be described here redundantly.

As to apparatus embodiments, reference can be made to the method embodiments, since the apparatus embodiments substantially correspond to the method embodiments. The apparatus embodiments mentioned above are merely illustrative. The units described as separated components may or may not be physically separated, and components displayed as units may or may not be physical units, i.e., they may be located at the same place or distributed over a plurality of network units. The object of the solution of the present disclosure may be achieved by selecting some or all of the modules as practically required, as can be understood and implemented without making inventive efforts.

Correspondingly, an embodiment of the present disclosure provides an apparatus for alerting a cooking state, including: a processor; and a memory for storing instructions executable by the processor. The processor is configured to: detect a current cooking state of the electric cooker; generate cooking state alert information when a preset cooking state is detected; and send the cooking state alert information to a target terminal for alerting a user to the current cooking state of the electric cooker.

Figure 14:
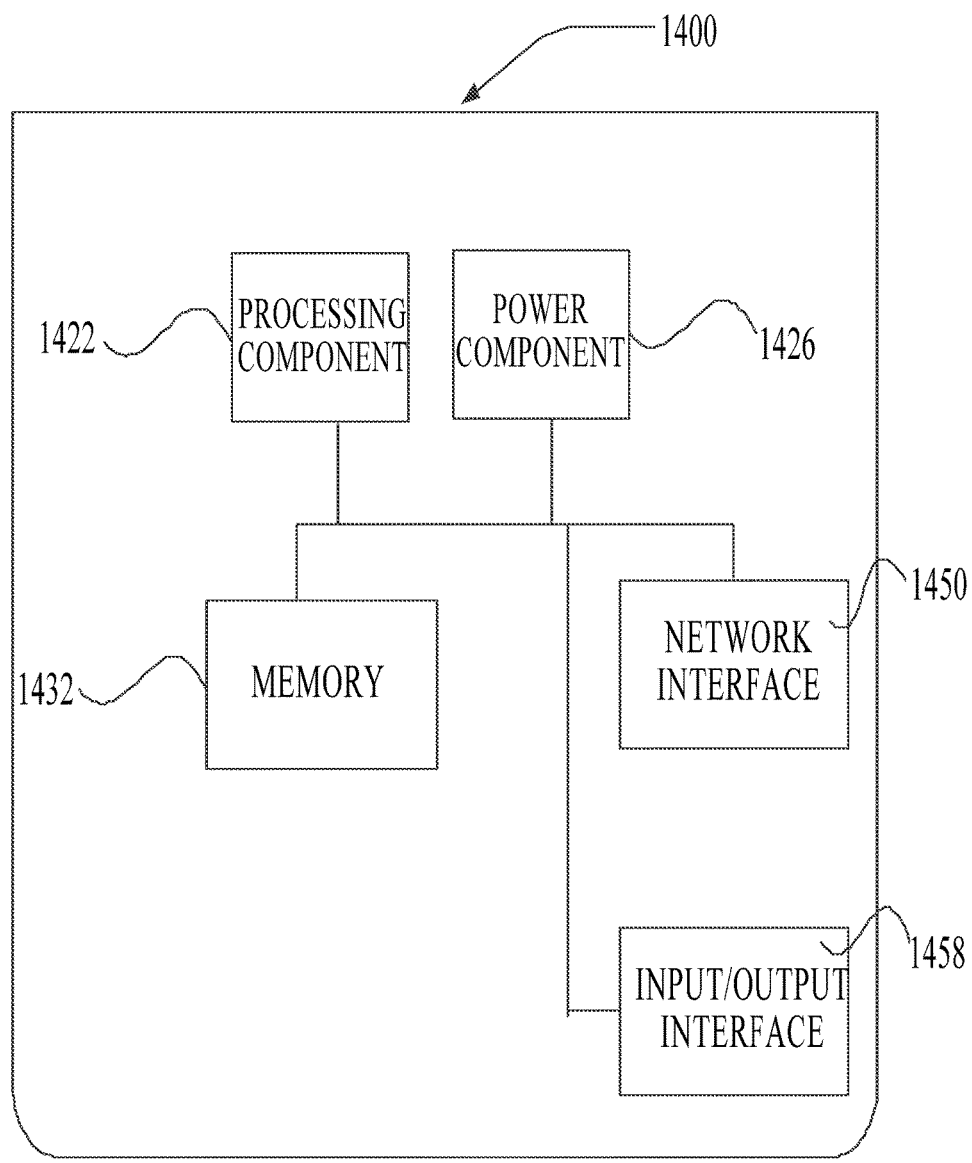
FIG. 14 is a schematic diagram of a structure of an apparatus for alerting a cooking state according to an exemplary embodiment of the present disclosure.

FIG. 14 is a schematic diagram of a structure of an apparatus for alerting a cooking state 1400 according to an exemplary embodiment. For example, the apparatus 1400 may be provided as a smart electric cooker. Referring to FIG. 14, the apparatus 1400 includes a processing component 1422, which further includes one or more processors, and memory resources represented by a memory 1432 for storing instructions executable by the processing component 1422, such as an application. The application stored in the memory 1432 may include one or more modules each corresponding to a group of instructions. In addition, the processing component 1422 is configured to execute instructions so as to execute the above method.

The apparatus 1400 may also include a power component 1426 configured to execute the power supply management for the apparatus 1400, a wired or wireless network interface 1450 configured to connect the apparatus 1400 to a network and an input/output (I/O) interface 1458. The apparatus 1400 may operate an operating system stored in the memory 1432, such as Android, IOS, Windows Server™, Mac OS X™, Unix™, Linux™, FreeBSD™ or the like.

In exemplary embodiments, there is also provided a non-transitory computer readable storage medium including instructions, such as included in the memory, executable by the processor of the apparatus, for performing the above-described methods. For example, the non-transitory computer-readable storage medium may be a ROM, a RAM, a CD-ROM, a magnetic tape, a floppy disc, an optical data storage device, and the like.

Other embodiments of the present disclosure will be apparent to those skilled in the art from consideration of the specification and practice of the present disclosure disclosed here. This disclosure is intended to cover any variations, uses, or adaptations of the present disclosure following the general principles thereof and including such departures from the present disclosure as come within known or customary practice in the art. It is intended that the specification and embodiments be considered as exemplary only, with a true scope and spirit of the present disclosure being indicated by the appended claims.

It will be appreciated that the present disclosure is not limited to the exact construction that has been described above and illustrated in the accompanying drawings, and that various modifications and changes can be made without departing from the scope thereof. It is intended that the scope of the present disclosure only be limited by the appended claims.

What is claimed is:

1. A method for alerting a cooking state of an electric cooker, the method comprising:
   detecting a current cooking state of the electric cooker;
   generating cooking state alert information when a preset cooking state is detected; and
   sending the cooking state alert information to a target terminal for alerting a user to the current cooking state of the electric cooker;
   wherein the preset cooking state at least includes the following states:
   a cooking completion state;
   a state of reaching a target cooking stage; and
   a state where there is a preset time before completion of a cooking task;
   wherein sending the cooking state alert information to the target terminal comprises:
   determining the target terminal; and
   sending the cooking state alert information to the target terminal;
   wherein determining the target terminal comprises:
   sending terminal query information comprising a device identification of the electric cooker to an intermediate device to enable the intermediate device to acquire associated terminal information according to the device identification of the electric cooker, the associated terminal information comprising terminal identifications of all communication terminals within the same local area network as the electric cooker; and
   receiving the associated terminal information and determining the target terminal according to a preset rule;
   wherein sending the cooking state alert information to the target terminal comprises:
   detecting a current operating state of the target terminal; and
   pushing the cooking state alert information to the target terminal when the target terminal is in an ON state.

2. The method according to claim 1, wherein detecting the current operating state of the target terminal comprises:

sending operating state query information comprising a terminal identification of the target terminal to an intermediate device to enable the intermediate device to generate operating state response information according to the terminal identification of the target terminal;
receiving the operating state response information sent by the intermediate device; and
determining the current operating state of the target terminal according to the operating state response information.

3. The method according to claim 1, wherein the target terminal is a smart TV.

4. An apparatus for alerting a cooking state of an electric cooker, the apparatus comprising:
a processor; and
a memory for storing instructions executable by the processor;
wherein the processor is configured to:
detect a current cooking state of the electric cooker;
generate cooking state alert information when a preset cooking state is detected; and
send the cooking state alert information to a target terminal for alerting a user to the current cooking state of the electric cooker;
wherein the preset cooking state at least includes the following states:
a cooking completion state;
a state of reaching a target cooking stage; and
a state where there is a preset time before completion of a cooking task;
wherein the processor configured to send the cooking state alert information to a target terminal is further configured to:
determine the target terminal; and
send the cooking state alert information to the target terminal;
wherein the processor configured to determine the target terminal is further configured to:
send terminal query information comprising a device identification of the electric cooker to an intermediate device to enable the intermediate device to acquire associated terminal information according to the device identification of the electric cooker, the associated terminal information comprising terminal identifications of all communication terminals within the same local area network as the electric cooker; and
receive the associated terminal information and determining the target terminal according to a preset rule;
wherein the processor configured to send the cooking state alert information to the target terminal is further configured to:
detect a current operating state of the target terminal; and
push the cooking state alert information to the target terminal when the target terminal is in an ON state.

5. The apparatus of claim 4, wherein the processor configured to detect the current operating state of the target terminal is further configured to:
send operating state query information comprising a terminal identification of the target terminal to an intermediate device to enable the intermediate device to generate operating state response information according to the terminal identification of the target terminal;
receive the operating state response information sent by the intermediate device; and
determine the current operating state of the target terminal according to the operating state response information.

6. The apparatus of claim 4, wherein the target terminal is a smart TV.

7. A non-transitory computer-readable storage medium having stored therein instructions that, when executed by a processor of a mobile terminal, causes the mobile terminal to perform a method for alerting a cooking state of an electric cooker, the method comprising:
detecting a current cooking state of the electric cooker;
generating cooking state alert information when a preset cooking state is detected; and
sending the cooking state alert information to a target terminal for alerting a user to the current cooking state of the electric cooker;
wherein the preset cooking state at least includes the following states:
a cooking completion state;
a state of reaching a target cooking stage;
a state where there is a preset time before completion of a cooking task;
wherein sending the cooking state alert information to the target terminal comprises:
determining the target terminal; and
sending the cooking state alert information to the target terminal;
wherein determining the target terminal comprises:
sending terminal query information comprising a device identification of the electric cooker to an intermediate device to enable the intermediate device to acquire associated terminal information according to the device identification of the electric cooker, the associated terminal information comprising terminal identifications of all communication terminals within the same local area network as the electric cooker; and
receiving the associated terminal information and determining the target terminal according to a preset rule;
wherein sending the cooking state alert information to the target terminal comprises:
detecting a current operating state of the target terminal; and
pushing the cooking state alert information to the target terminal when the target terminal is in an ON state.

8. The storage medium of claim 7, wherein detecting the current operating state of the target terminal comprises:
sending operating state query information comprising a terminal identification of the target terminal to an intermediate device to enable the intermediate device to generate operating state response information according to the terminal identification of the target terminal;
receiving the operating state response information sent by the intermediate device; and
determining the current operating state of the target terminal according to the operating state response information.

* * * * *